United States Patent
Vaidyanathan et al.

(10) Patent No.: US 7,769,562 B2
(45) Date of Patent: Aug. 3, 2010

(54) METHOD AND APPARATUS FOR DETECTING DEGRADATION IN A REMOTE STORAGE DEVICE

(75) Inventors: Kalyanaraman Vaidyanathan, San Diego, CA (US); Kenny C. Gross, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 644 days.

(21) Appl. No.: 11/598,398

(22) Filed: Nov. 13, 2006

(65) Prior Publication Data

US 2008/0115014 A1   May 15, 2008

(51) Int. Cl.
G01K 1/08 (2006.01)
G06F 11/30 (2006.01)
G06F 11/00 (2006.01)
G21C 17/00 (2006.01)

(52) U.S. Cl. .................. 702/183; 700/29; 700/30; 702/132; 702/182; 702/186; 714/25; 714/47

(58) Field of Classification Search ............... 714/47, 714/25; 700/29, 30; 702/132, 183, 182, 702/186

See application file for complete search history.

(56) References Cited

U.S. PATENT DOCUMENTS

| | | | | |
|---|---|---|---|---|
| 5,764,509 | A * | 6/1998 | Gross et al. | 700/29 |
| 6,181,975 | B1 * | 1/2001 | Gross et al. | 700/29 |
| 6,609,036 | B1 * | 8/2003 | Bickford | 700/30 |
| 6,950,773 | B1 * | 9/2005 | Gross et al. | 702/132 |
| 7,188,050 | B2 * | 3/2007 | Yuan et al. | 702/183 |
| 2002/0087290 | A1 * | 7/2002 | Wegerich et al. | 702/182 |
| 2002/0091499 | A1 * | 7/2002 | Wegerich et al. | 702/182 |
| 2003/0065986 | A1 * | 4/2003 | Fraenkel et al. | 714/47 |
| 2003/0074169 | A1 * | 4/2003 | Vanderwiel | 703/6 |
| 2004/0002776 | A1 * | 1/2004 | Bickford | 700/30 |
| 2004/0006398 | A1 * | 1/2004 | Bickford | 700/30 |
| 2004/0078723 | A1 * | 4/2004 | Gross et al. | 714/47 |
| 2004/0215673 | A1 * | 10/2004 | Furukawa et al. | 707/204 |
| 2004/0260515 | A1 * | 12/2004 | Wegerich et al. | 702/182 |
| 2004/0260516 | A1 * | 12/2004 | Czerwonka | 702/186 |
| 2005/0188263 | A1 * | 8/2005 | Gross et al. | 714/25 |
| 2006/0015294 | A1 * | 1/2006 | Yetter et al. | 702/183 |
| 2007/0040582 | A1 * | 2/2007 | Gross et al. | 326/88 |

OTHER PUBLICATIONS

Cassidy, "Advanced Recognition for Detection of COmplex Software Aging Phenomena in Online Transaction Processing Servers", 2002, IEEE Computer Society, pp. 1-5.*

* cited by examiner

*Primary Examiner*—Robert Beausoliel
*Assistant Examiner*—Jeison C Arcos
(74) *Attorney, Agent, or Firm*—Park, Vaughan & Fleming LLP

(57) ABSTRACT

A system that monitors telemetry from a host computer system to detect degradation in a remote storage device. During operation, the system monitors performance parameters from a host computer system which accesses the remote storage device, wherein the performance parameters relate to the interactions between the host computer system and the remote storage device. The system then determines whether the monitored performance parameters have deviated from predicted values for the performance parameters. If so, the system generates a signal indicating that the remote storage device has degraded.

23 Claims, 3 Drawing Sheets

METHOD AND APPARATUS FOR DETECTING DEGRADATION IN A REMOTE STORAGE DEVICE

BACKGROUND

1. Field of the Invention

The present invention relates to a method and apparatus for detecting degradation in a remote storage device.

2. Related Art

Enterprise computer systems often include a large number of hard disk drives. For example, a single server system can sometimes have as many as 15,000 hard disk drives. Losing data stored on these disk drives can have a devastating effect on an organization. For example, airlines rely on the integrity of data stored in their reservation systems for most of their day-to-day operations, and would essentially cease to function if this data became lost or corrupted. If fault-prone hard disk drives can be identified before they fail, preventative measures can be taken to avoid such failures.

Present techniques that are used to identify hard disk drives that are likely to fail have many shortcomings. One technique analyzes internal counter-type variables, such as read retries, write retries, seek errors, dwell time (time between reads/writes) to determine whether a disk drive is likely to fail. Unfortunately, in practice, this technique suffers from a high missed-alarm probability (MAP) of 50%, and a false-alarm probability (FAP) of 1%. This high MAP increases the probability of massive data loss, and the FAP causes a large number of No-Trouble-Found (NTF) drives to be returned, resulting in increased warranty costs.

Another technique monitors internal discrete performance metrics within disk drives, for example, by monitoring internal diagnostic counter-type variables called "SMART variables." However, hard disk drive manufacturers are reluctant to add extra diagnostics to monitor these variables, because doing so increases the cost of the commodity hard disk drives. Furthermore, in practice, this technique fails to identify approximately 50% of imminent hard disk drive failures.

To prevent catastrophic data loss due to hard disk failures, systems often use redundant arrays of inexpensive disks (RAID). Unfortunately, because the capacity of hard disk drives have increased dramatically in recent years, the time needed to rebuild a RAID disk after a failure of one of the disks has also increased dramatically. Consequently, the rebuild process can take many hours to several days, during which time the system is susceptible to a second hard disk drive failure which would cause massive data loss. Furthermore, data loss can occur if a second disk fails before a first disk is replaced. Hence, even the most advanced redundancy-based solutions are susceptible to data loss.

Moreover, some computer systems store data to remote storage devices. Typically, information about the health of the remote storage device is not available to the computer system. Hence, the computer system cannot determine whether the remote storage device is at the onset of degradation.

Hence, what is needed is a method and an apparatus for detecting degradation of a remote storage device without the problems described above.

SUMMARY

One embodiment of the present invention provides a system that monitors telemetry from a host computer system to detect degradation in a remote storage device. During operation, the system monitors performance parameters from a host computer system which accesses the remote storage device, wherein the performance parameters relate to the interactions between the host computer system and the remote storage device. The system then determines whether the monitored performance parameters have deviated from predicted values for the performance parameters. If so, the system generates a signal indicating that the remote storage device has degraded.

In a variation on this embodiment, prior to determining whether the performance parameters have deviated from predicted values, the system uses a non-linear non-parametric regression technique to generate the predicted values for the monitored performance parameters based on a model of the host computer system which was generated while the remote storage device was operating in a non-degraded state.

In a further variation, the non-linear non-parametric regression technique is a multivariate state estimation technique (MSET).

In a further variation, prior to using the non-linear non-parametric regression technique to generate predicted values for the monitored performance parameters, the system preprocesses the monitored performance parameters to remove outlying and flat data.

In a further variation, prior to monitoring the performance parameters, the system generates the model during a training phase by: (1) monitoring the performance parameters from the host computer system while the remote storage device is operating in a non-degraded state; (2) preprocessing the monitored performance parameters to remove outlying and flat data; and (3) using the non-linear non-parametric regression technique to build the model.

In a variation on this embodiment, while determining whether the performance parameters have deviated from predicted values, the system determines whether the monitored performance parameters have deviated a specified amount from the predicted values.

In a variation on this embodiment, while determining whether the performance parameters have deviated from predicted values, the system uses a sequential probability ratio test (SPRT).

In a variation on this embodiment, the remote storage device can include: a hard disk drive or a storage array.

In a variation on this embodiment, the performance parameters can include disk-related metrics, which can include: average service time; average response time; number of kilobytes (kB) read per second; number of kB written per second; number of read requests per second; number of write requests per second; and number of soft errors per second.

In a variation on this embodiment, the performance parameters can include software variables, which can include: load metrics; CPU utilization; idle time; memory utilization; transaction latencies; and other performance metrics reported by the operating system.

In a variation on this embodiment, the performance parameters can include hardware variables, which can include: temperature; voltage; current; and fan speed.

DETAILED DESCRIPTION

Figure 1:
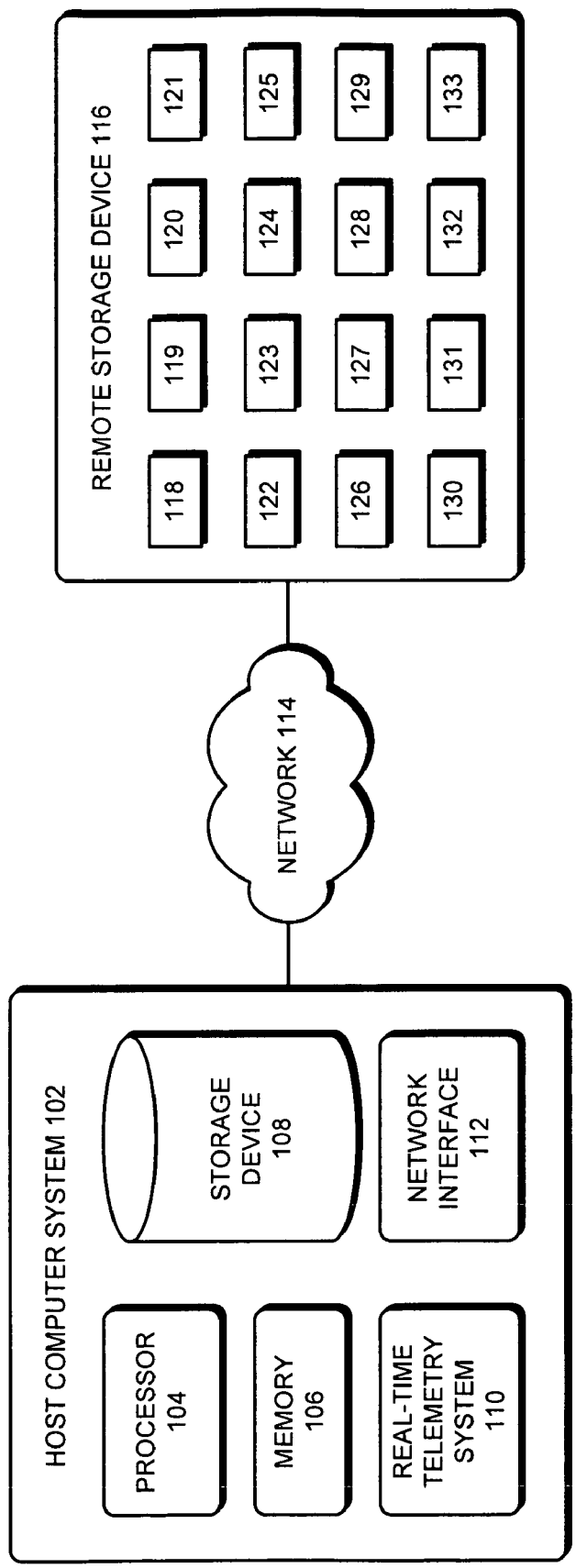
FIG. 1 presents a block diagram illustrating a host computer system and a remote storage device in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

One embodiment of the present invention monitors telemetry data from a host computer system, which accesses a remote storage device, to determine whether the remote storage device has degraded. The telemetry data can include performance parameters collected from physical and software sensors for the host computer system. In one embodiment of the present invention, performance parameters from the remote storage device are not directly monitored and the determination of whether the remote storage device has degraded is based only on the performance parameters monitored from the host computer system.

In one embodiment of the present invention, the performance parameters from the host computer system are processed by a pattern recognition tool to detect degradation in the remote storage device.

In one embodiment of the present invention, if the pattern recognition tool identifies that the remote storage device is at the onset of degradation, preemptive actions can be taken to prevent a catastrophic failure of the remote storage device. For example, the preemptive actions can include: replacing a degraded storage device; or failing-over to a redundant storage device. Typically, the time-to-failure that is predicted is sufficiently long to allow for these preemptive actions.

In one embodiment of the present invention, a non-linear non-parametric (NLNP) regression technique is used to analyze the performance parameters.

In one embodiment of the present invention, during a training phase, the NLNP regression technique builds a model of the host computer system based on performance parameters monitored from the host computer system while the host computer system accesses a remote storage device which is operating in a non-degraded state. The model of the host computer system is then used during the monitoring phase to generate predicted values of the performance parameters for the host computer system. In one embodiment of the present invention, a discrepancy between a predicted value for a performance parameter and a monitored value for the performance parameter results in an alarm being generated.

In one embodiment of the present invention, a sequential probability ratio test (SPRT) is used to determine whether the discrepancy in the values of the performance parameters warrants an alarm being generated.

Note that although this specification describes the present invention as applied to monitoring disk drives, the present invention can generally be applied to any storage device, including but not limited to, magnetic, optical, and magneto-optical storage devices, as well as storage devices based on flash memory and/or battery-backed up memory, or any other type of non-volatile storage device.

Computer System

FIG. 1 presents a block diagram illustrating a host computer system 102 and a remote storage device 116 in accordance with an embodiment of the present invention. Host computer system 102 includes processor 104, memory 106, storage device 108, real-time telemetry system 110, and network interface 112.

Processor 104 can generally include any type of processor, including, but not limited to, a microprocessor, a mainframe computer, a digital signal processor, a personal organizer, a device controller and a computational engine within an appliance. Memory 106 can include any type of memory, including but not limited to, dynamic random access memory (DRAM), static random access memory (SRAM), flash memory, and read only memory (ROM). Storage device 108 can include any type of non-volatile storage device that can be coupled to a computer system. This includes, but is not limited to, magnetic, optical, and magneto-optical storage devices, as well as storage devices based on flash memory and/or battery-backed up memory. Network interface 112 can include any type of interface that provides connectivity between a computer system and a network, including, but not limited to, a wireless network interface, an Ethernet interface, and a phone network interface.

In one embodiment of the present invention, real-time telemetry system 110 is separate from host computer system 102. Note that real-time telemetry system 110 is described in more detail below with reference to FIG. 2.

Host computer system 102 uses network interface 112 to interact with remote storage device 116 through network 114. Note that network 114 can generally include any type of wired or wireless communication channel capable of coupling together computing nodes. This includes, but is not limited to, a local area network, a wide area network, or a combination of networks. In one embodiment of the present invention, network 114 includes the Internet.

As illustrated in FIG. 1, remote storage device 116 is a storage array which includes storage devices 118-133, such as hard disk drives. In another embodiment of the present invention, remote storage device 116 contains a single storage device.

Real-Time Telemetry System

Figure 2:
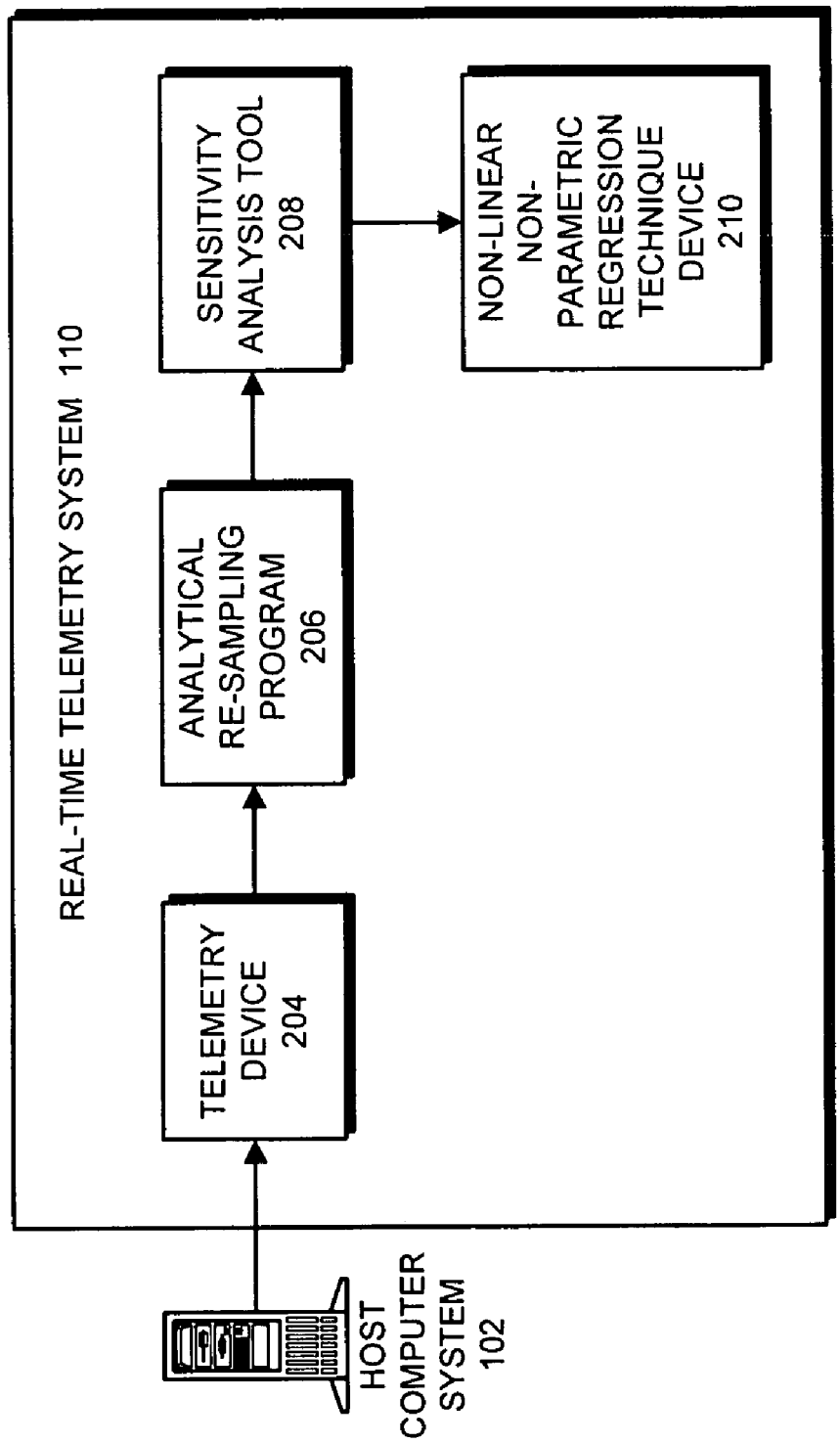
FIG. 2 illustrates a real-time telemetry system in accordance with an embodiment of the present invention.

FIG. 2 illustrates real-time telemetry system 110 in accordance with an embodiment of the present invention. Referring to FIG. 2, host computer system 102 can generally include any computational node including a mechanism for servicing requests from a client for computational and/or data storage resources. In the present embodiment, host computer system 102 is a high-end uniprocessor or multiprocessor server that is being monitored by real-time telemetry system 110.

Real-time telemetry system 110 contains telemetry device 204, analytical re-sampling program 206, sensitivity analysis tool 208, and non-linear non-parametric (NLNP) regression device 210. In one embodiment of the present invention, NLNP regression device 210 uses a multi-variate state estimation technique (MSET) device. Telemetry device 204 gathers information from the various sensors and monitoring tools within server 202, and directs the signals to a remote location that contains analytical re-sampling program 206, sensitivity analysis tool 208, and NLNP regression device 210. Note that NLNP regression device 210 is described in more detail below.

The term "MSET" as used in this specification refers to a multivariate state estimation technique, which loosely represents a class of pattern recognition algorithms. For example, see [Gribok] "Use of Kernel Based Techniques for Sensor Validation in Nuclear Power Plants," by Andrei V. Gribok, J. Wesley Hines, and Robert E. Uhrig, *The Third American Nuclear Society International Topical Meeting on Nuclear Plant Instrumentation and Control and Human-Machine Interface Technologies*, Washington D.C., Nov. 13-17, 2000. This paper outlines several different pattern recognition approaches. Hence, the term "MSET" as used in this specification can refer to (among other things) any technique outlined in [Gribok], including Ordinary Least Squares (OLS), Support Vector Machines (SVM), Artificial Neural Networks (ANNs), MSET, or Regularized MSET (RMSET).

Analytical re-sampling program 206 ensures that the monitored signals have a uniform sampling rate. In doing so, analytical re-sampling program 206 uses interpolation techniques, if necessary, to fill in missing data points, or to equalize the sampling intervals when the raw data is non-uniformly sampled.

After the signals pass through analytical re-sampling program 206, they are aligned and correlated by sensitivity analysis tool 108. For example, in one embodiment of the present invention sensitivity analysis tool 208 incorporates a novel moving window technique that "slides" through the signals with systematically varying window widths. The system systematically varies the alignment between sliding windows for different signals to optimize the degree of association between the signals, as quantified by an "F-statistic," which is computed and ranked for all signal windows by sensitivity analysis tool 108.

While statistically comparing the quality of two fits, F-statistics reveal the measure of regression. The higher the value of the F-statistic, the better the correlation is between two signals. The lead/lag value for the sliding window that results in the F-statistic with the highest value is chosen, and the candidate signal is aligned to maximize this value. This process is repeated for each signal by sensitivity analysis tool 208.

Signals that have an F-statistic very close to 1 are "completely correlated" and can be discarded. This can result when two signals are measuring the same metric, but are expressing them in different engineering units. For example, a signal can convey a temperature in degrees Fahrenheit, while a second signal conveys the same temperature in degrees Centigrade. Since these two signals are perfectly correlated, one does not contain any additional information over the other, and therefore, one may be discarded.

Some signals may exhibit little correlation, or no correlation whatsoever. In this case, these signals may be dropped because they add little predictive information. Once a highly correlated subset of the signals has been determined, they are combined into one group or cluster for processing by the NLNP regression device 210.

Nonlinear, Nonparametric Regression

The present invention introduces a novel approach for detecting degradation in a remote storage device. To this end, one embodiment of the present invention uses an advanced pattern recognition approach, which produces predicted values of performance parameters for host computer system 102 based on: (1) software variables reported by the operating system on host computer system 102, (2) hardware variables generated by the sensors on host computer system 102, and (3) a model of host computer system 102 which was generated during a training phase.

One embodiment of the present invention continuously monitors a variety of instrumentation signals in real time during operation of the server. (Note that although we refer to a single computer system in this disclosure, the present invention can also apply to a collection of computer systems).

These instrumentation signals can also include signals associated with internal performance parameters maintained by software within the computer system. For example, these internal performance parameters can include, but are not limited to, system throughput, transaction latencies, queue lengths, central processing unit (CPU) utilization, load on CPU, idle time, memory utilization, load on the memory, load on the cache, I/O traffic, bus saturation metrics, FIFO overflow statistics, and various operational profiles gathered through "virtual sensors" located within the operating system.

These instrumentation signals can also include signals associated with canary performance parameters for synthetic user transactions, which are periodically generated for the purpose of measuring quality of service from the end user's perspective.

These instrumentation signals can additionally include hardware variables, including, but not limited to, internal temperatures, voltages, currents, and fan speeds.

Furthermore, these instrumentation signals can include disk-related metrics for a remote storage device, including, but not limited to, average service time, average response time, number of kilobytes (kB) read per second, number of kB written per second, number of read requests per second, number of write requests per second, and number of soft errors per second.

The foregoing instrumentation parameters are monitored continuously with an advanced statistical pattern recognition technique. One embodiment of the present invention uses a class of techniques known as nonlinear, nonparametric (NLNP) regression techniques. One such regression technique is the Multivariate State Estimation Technique (MSET). Alternatively, the present invention can use other pattern recognition techniques, such as neural networks or other types of NLNP regression. Another embodiment of the present invention uses a linear regression technique. In each case, the pattern recognition module learns how the behavior of host computer system 102 relates to the health of remote storage device 116. The pattern recognition module then generates a model of host computer system 102 that is used to determine whether remote storage device has degraded. This determination is made without directly monitoring performance parameters from remote storage device 116.

In one embodiment of the present invention, the components from which the instrumentation signals originate are field replaceable units (FRUs), which can be independently monitored. Note that all major system components, including both hardware and software components, can be decomposed into FRUs. (For example, a software FRU can include: an operating system, a middleware component, a database, or an application.)

Also note that the present invention is not meant to be limited to server computer systems. In general, the present invention can be applied to any type of computer system. This includes, but is not limited to, a computer system based on a microprocessor, a mainframe computer, a digital signal processor, a portable computing device, a personal organizer, a device controller, and a computational engine within an appliance.

Detecting Degradation on a Remote Storage Device

Figure 3:
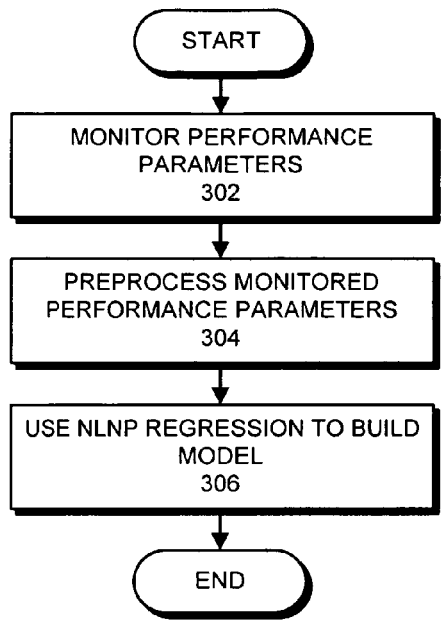
FIG. 3 presents a flowchart illustrating the process of generating a model of the host computer system during a training phase in accordance with an embodiment of the present invention.

FIG. 3 presents a flowchart illustrating the process of generating a model of the host computer system during a training phase in accordance with an embodiment of the present invention. The process begins when the system monitors the performance parameters from the host computer system while the remote storage device is operating in a non-degraded state (step 302). Next, the system preprocesses the monitored performance parameters to remove outlying and flat data (step 304). The system then uses the non-linear non-parametric regression technique to build the model (step 306).

Figure 4:
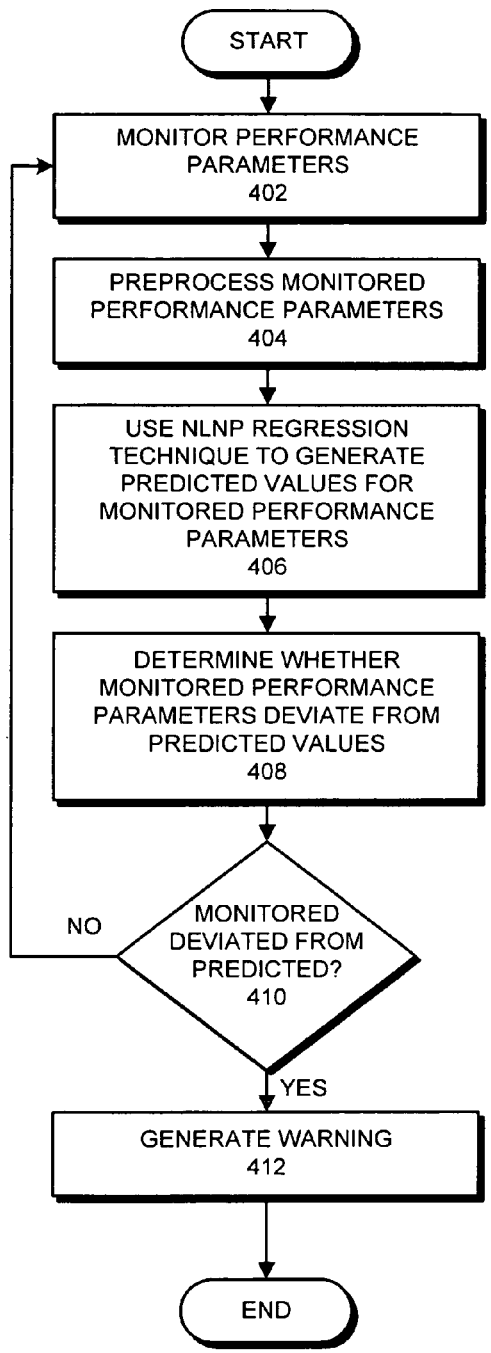
FIG. 4 presents a flowchart illustrating the process of monitoring telemetry from a host computer system to detect degradation in a remote storage device in accordance with an embodiment of the present invention.

FIG. 4 presents a flowchart illustrating the process of monitoring telemetry from a host computer system during a subsequent monitoring phase to detect degradation in a remote storage device in accordance with an embodiment of the present invention. The process begins when the system monitors performance parameters from a host computer system which accesses the remote storage device, wherein the performance parameters relate to the interactions between the host computer system and the remote storage device (step 402). Next, the system preprocesses the monitored performance parameters to remove outlying and flat data (step 404). The system then uses a non-linear non-parametric regression technique to generate the predicted values for the monitored performance parameters based on a model of the host computer system which was generated while the remote storage device was operating in a non-degraded state (step 406).

Next, the system determines whether the monitored performance parameters have deviated from predicted values for the performance parameters (step 408). In one embodiment of the present invention, while determining whether the performance parameters have deviated from predicted values, the system determines whether the monitored performance parameters have deviated a specified amount from the predicted values. In another embodiment of the present invention, the system uses a sequential probability ration test (SPRT) to determine whether the performance parameters have deviated from predicted values.

If the monitored performance parameters have deviated from predicted values for the performance parameters (step 410—yes), the system generates a signal indicating that the remote storage device has degraded (step 412). Otherwise (step 410—no), the system continues monitoring performance parameters (step 402).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for monitoring telemetry from a host computer system to detect degradation in a remote storage device, comprising:

monitoring performance parameters from a host computer system which accesses the remote storage device, wherein the performance parameters relate to interactions between the host computer system and the remote storage device;

for each of the monitored performance parameters:

using a moving window with varying window width for the monitored performance parameter and moving windows with varying window widths for each of the other monitored performance parameters to slide through the monitored performance parameter and each of the other monitored performance parameters;

varying an alignment between the moving window for the monitored performance parameter and the moving windows for each of the other monitored performance parameters to optimize a degree of association between the monitored performance parameter and each of the other monitored performance parameters;

determining the degree of association by determining a set of F-statistic values for the monitored performance parameter for each of the other monitored performance parameters, wherein an F-statistic value for each of the other monitored performance parameters indicates a correlation between the monitored performance parameter and each of the other monitored performance parameters; and using the set of F-statistic values to discard one or more monitored performance parameters that are correlated by more than a predetermined amount;

determining whether the monitored performance parameters have deviated from predicted values for the performance parameters; and if so, generating a signal indicating that the remote storage device has degraded.

2. The method of claim 1, wherein prior to determining whether the performance parameters have deviated from predicted values, the method further comprises using a non linear non parametric regression technique to generate the predicted values for the monitored performance parameters based on a model of the host computer system which was generated while the remote storage device was operating in a non degraded state.

3. The method of claim 2, wherein the non linear non parametric regression technique is a multivariate state estimation technique (MSET).

4. The method of claim 2, wherein prior to using the non linear non parametric regression technique to generate predicted values for the monitored performance parameters, the method further comprises preprocessing the monitored performance parameters to remove outlying and flat data.

5. The method of claim 2, wherein prior to monitoring the performance parameters, the method further comprises generating the model during a training phase by:

monitoring the performance parameters from the host computer system while the remote storage device is operating in a non degraded state;

preprocessing the monitored performance parameters to remove outlying and flat data; and using the non linear non parametric regression technique to build the model.

6. The method of claim 1, wherein determining whether the performance parameters have deviated from predicted values involves determining whether the monitored performance parameters have deviated a specified amount from the predicted values.

7. The method of claim 1, wherein determining whether the performance parameters have deviated from predicted values involves using a sequential probability ratio test (SPRT).

8. The method of claim 1, wherein the remote storage device can include:
- a hard disk drive; or
- a storage array.

9. The method of claim 1, wherein the performance parameters can include disk related metrics, which can include:
- average service time;
- average response time;
- number of kilobytes (kB) read per second;
- number of kB written per second;
- number of read requests per second;
- number of write requests per second; and
- number of soft errors per second.

10. The method of claim 1, wherein the performance parameters can include software variables, which can include:
- load metrics;
- CPU utilization;
- idle time;
- memory utilization;
- transaction latencies; and
- other performance metrics reported by the operating system.

11. The method of claim 1, wherein the performance parameters can include hardware variables, which can include:
- temperature;
- voltage;
- current; and
- fan speed.

12. A computer-readable storage medium storing instructions that when executed by a computer cause the computer to perform a method for monitoring telemetry from a host computer system to detect degradation in a remote storage device, wherein the method comprises:
monitoring performance parameters from a host computer system which accesses the remote storage device, wherein the performance parameters relate to interactions between the host computer system and the remote storage device;
for each of the monitored performance parameters:
using a moving window with varying window width for the monitored performance parameter and moving windows with varying window widths for each of the other monitored performance parameters to slide through the monitored performance parameter and the other monitored performance parameters;
varying an alignment between the moving window for the monitored performance parameter and the moving windows for each of the other monitored performance parameters to optimize a degree of association between the monitored performance parameter and each of the other monitored performance parameters;
determining the degree of association by determining a set of F-statistic values for the monitored performance parameter for each of the other monitored performance parameters, wherein an F-statistic value for each of the other monitored performance parameters indicates a correlation between the monitored performance parameter and each of the other monitored performance parameters; and
using the set of F-statistic values to discard one or more monitored performance parameters that are correlated by more than a predetermined amount;
determining whether the monitored performance parameters have deviated from predicted values for the performance parameters; and
if so, generating a signal indicating that the remote storage device has degraded.

13. The computer-readable storage medium of claim 12, wherein prior to determining whether the performance parameters have deviated from predicted values, the method further comprises using a non linear non parametric regression technique to generate the predicted values for the monitored performance parameters based on a model of the host computer system which was generated while the remote storage device was operating in a non degraded state.

14. The computer-readable storage medium of claim 13, wherein the non linear non parametric regression technique is a multivariate state estimation technique (MSET).

15. The computer-readable storage medium of claim 13, wherein prior to using the non linear non parametric regression technique to generate predicted values for the monitored performance parameters, the method further comprises preprocessing the monitored performance parameters to remove outlying and flat data.

16. The computer-readable storage medium of claim 13, wherein prior to monitoring the performance parameters, the method further comprises generating the model during a training phase by:
monitoring the performance parameters from the host computer system while the remote storage device is operating in a non degraded state;
preprocessing the monitored performance parameters to remove outlying and flat data; and
using the non linear non parametric regression technique to build the model.

17. The computer-readable storage medium of claim 12, wherein determining whether the performance parameters have deviated from predicted values involves determining whether the monitored performance parameters have deviated a specified amount from the predicted values.

18. The computer-readable storage medium of claim 12, wherein determining whether the performance parameters have deviated from predicted values involves using a sequential probability ratio test (SPRT).

19. The computer-readable storage medium of claim 12, wherein the remote storage device can include:
- a hard disk drive; or
- a storage array.

20. The computer-readable storage medium of claim 12, wherein the performance parameters can include disk related metrics, which can include:
- average service time;
- average response time;
- number of kilobytes (kB) read per second;
- number of kB written per second;
- number of read requests per second;
- number of write requests per second; and
- number of soft errors per second.

21. The computer-readable storage medium of claim 12, wherein the performance parameters can include software variables, which can include:
- load metrics;
- CPU utilization;
- idle time;
- memory utilization;
- transaction latencies; and
- other performance metrics reported by the operating system.

22. The computer-readable storage medium of claim 12, wherein the performance parameters can include hardware variables, which can include:
- temperature;
- voltage;
- current; and
- fan speed.

23. An apparatus that monitors telemetry from a host computer system to detect degradation in a remote storage device, comprising:
- a monitoring mechanism, which is configured to:
  - monitor performance parameters from a host computer system, wherein the performance parameters relate to the interactions between the host computer system and a remote storage device;
  - for each of the monitored performance parameters:
    - use a moving window with varying window width for the monitored performance parameter and moving windows with varying window widths for each of the other monitored performance parameters to slide through the monitored performance parameter and the other monitored performance parameters;
    - vary an alignment between the moving window for the monitored performance parameter and the moving windows for each of the other monitored performance parameters to optimize a degree of association between the monitored performance parameter and each of the other monitored performance parameters;
    - determine the degree of association by determining a set of F-statistic values for the monitored performance parameter for each of the other monitored performance parameters, wherein an F-statistic value for each of the other monitored performance parameters indicates a correlation between the monitored performance parameter and each of the other monitored performance parameters; and
    - use the set of F-statistic values to discard one or more monitored performance parameters that are correlated by more than a predetermined amount;
  - determine whether the monitored performance parameters have deviated from predicted values for the performance parameters; and
  - if so, to generate a signal indicating that the remote storage device has degraded.

* * * * *